J. H. ANDERSON.

VEHICLE POLE.

APPLICATION FILED NOV. 15, 1920.

Reissued Dec. 28, 1920. 15,015.

INVENTOR
JOHN H. ANDERSON
By Paul & Paul
HIS ATTORNEYS

UNITED STATES PATENT OFFICE.

JOHN H. ANDERSON, OF ST. PAUL, MINNESOTA.

VEHICLE-POLE.

15,015. Specification of Reissued Letters Patent. Reissued Dec. 28, 1920.

Original No. 1,356,252, dated October 19, 1920, Serial No. 132,344, filed November 20, 1916. Application for reissue filed November 15, 1920. Serial No. 424,284.

*To all whom it may concern:*

Be it known that I, JOHN H. ANDERSON, a citizen of the United States, resident of St. Paul, county of Ramsey, State of Minnesota, have invented certain new and useful Improvements in Vehicle-Poles, of which the following is a specification.

The object of my invention is to provide a means for reinforcing and strengthening a pole to the end that there will be no danger of breaking or splitting it when subjected to severe strain.

A further object is to provide a pole having a reinforcing means which will not only protect and strengthen the edges of the pole but will add materially to its appearance.

The invention consists generally in various constructions and combinations, all as hereinafter described and particularly pointed out in the claims.

In the accompanying drawings forming part of this specification,

Figure 1:
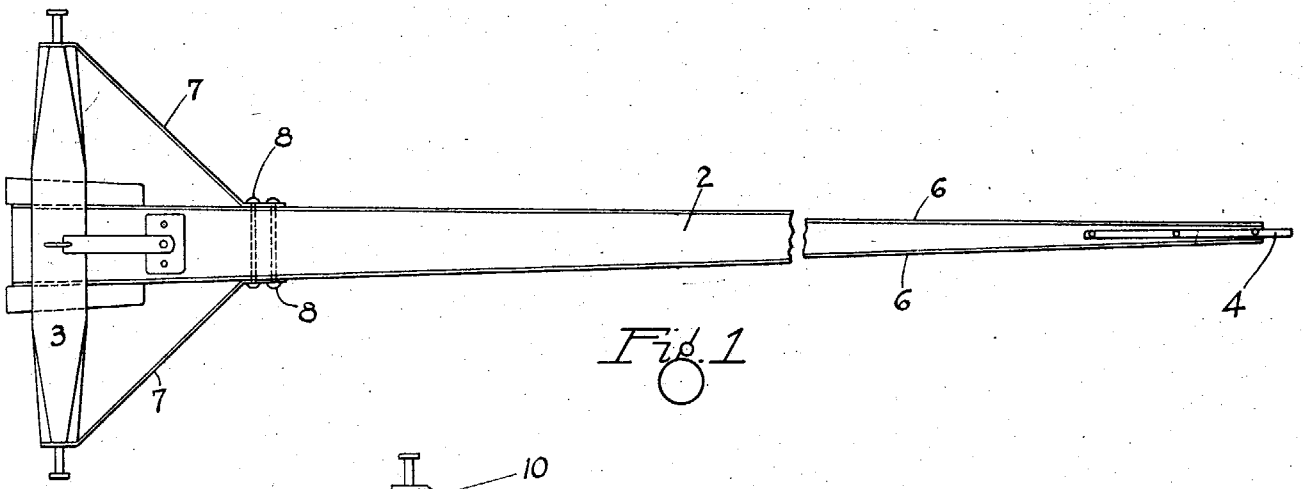
Figure 1 is a plan view of a vehicle pole embodying my invention.
Figure 2:
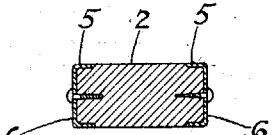
Fig. 2 is a transverse sectional view of the same.

In the drawing, 2 represents the pole, having one end mounted in the rocker 3 and tapered toward its outer end, whereto the usual clevis 4 is secured. The edges of the pole are rabbeted at 5 on each edge at the top and bottom and channel bars 6 are fitted to these edges, the flanges of the bars being flush substantially with the upper and under surfaces of the pole, as shown plainly in Fig. 2. The flanges to the channel bars are so disposed in the rabbets formed in the top and in the bottom of the pole that the edges of the metal flanges will bear against the shoulders formed by the rabbets, with the result that any longitudinal thrust on the pole tending to buckle the pole will be resisted by the edges of the flanges bearing against the shoulders of the rabbets in the top and bottom of the pole as well as by the web of the channel bars bearing against the sides of the pole. These channel bars are secured to the pole at intervals by screws, preferably, which hold the bars firmly in place while the flanges thereof support the upper and under surfaces and so brace and strengthen the edges of the pole that danger of splitting or cracking is prevented. Furthermore, by having these reinforcing bars on each side of the pole I am able to use a lighter pole, that is, one having the wooden part of less diameter than ordinarily required for a pole of this kind, and in the growing scarcity of wood suitable for poles of this kind, a construction which permits the use of wood of smaller dimensions effects a considerable saving in the first cost of the material.

Near the rocker 3 I provide braces 7 which are fastened to the ends of the rocker and have bolts 8 passing through the pole from one side to the other.

Figure 3:
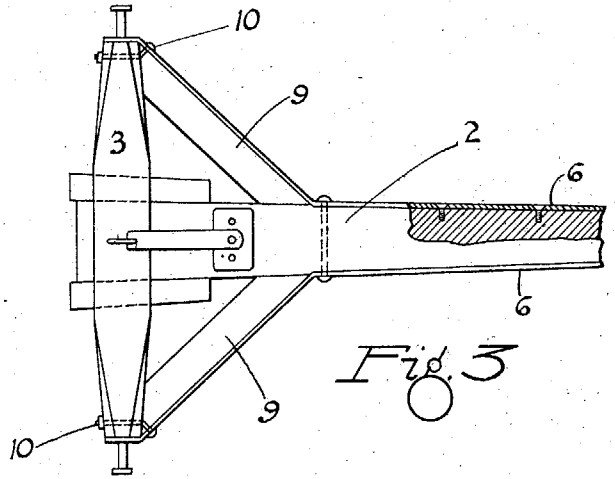
Fig. 3 is a plan view of a modified construction.

In Fig. 3 I have shown a slightly modified construction in which wooden braces 9 are provided between the pole and the ends of the rocker, while the bars 6 are outwardly turned to reinforce the outer face of these braces and are secured thereto and to the rocker by suitable means, such as bolts 10.

The pole may be made in various sizes, according to the sled or other vehicle on which it may be used.

I claim as my invention:

1. A vehicle pole comprising a wooden core or center, channel bars fitting the edges of said pole on each side and secured thereto, a rocker provided at one end of said pole, brace bars having their ends seated against said pole and the ends of said rocker, said channel bars having their ends adjacent said rocker outwardly turned and seated against the outer faces of said brace bars, and bolts passing through the ends of said channel bars, said braces and the ends of said tongue.

2. A vehicle pole comprising a wooden core or center tapered from the rear to its forward end and rabbeted at the top and bottom on each side, channel bars fitting the longitudinal edges of said pole and having their flanges seated in said rabbets, the surfaces of the flanges being flush substantially with the upper and under surfaces of the pole and the edges of said flanges bearing against the shoulders formed by said rabbets and resisting buckling of the pole under endwise thrust thereon, and means for securing said channels and said core together.

JOHN H. ANDERSON.

In presence of—
C. H. REHFUSS,
D. S. KELLOGG.